United States Patent
Brunner et al.

(10) Patent No.: US 6,301,470 B1
(45) Date of Patent: Oct. 9, 2001

(54) RADIO COMMUNICATIONS RECEIVER AND METHOD OF RECOVERING DATA FROM RADIO SIGNALS

(75) Inventors: Christopher Brunner; Martin Haardt, both of Munich (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/325,867

(22) Filed: Jun. 4, 1999

(30) Foreign Application Priority Data

Jun. 5, 1998 (EP) .................................................. 98110369

(51) Int. Cl.[7] .................................................. H04B 7/00
(52) U.S. Cl. .................................. 455/278.1; 455/277.2; 375/347
(58) Field of Search .................................. 455/63, 277.1, 455/277.2, 278.1, 279.1, 280, 295, 296, 560, 561, 562; 375/343, 346, 347, 349

(56) References Cited

U.S. PATENT DOCUMENTS

| 6,061,553 | * | 5/2000 | Buehrer et al. | 455/278.1 |
| 6,157,847 | * | 12/2000 | Matsuoka et al. | 455/278.1 |

FOREIGN PATENT DOCUMENTS

| 0 526 439 | 2/1993 | (EP) . |
| WO 97/02666 | 1/1997 | (WO) . |
| WO 97/08846 | 3/1997 | (WO) . |

OTHER PUBLICATIONS

C. Brunner, et al. "A two Step Spatio–Temporal Filtering Scheme for Smart Antennas Compared to a Multi–User Maximum Likelihood Algoriithm", Proceedings of the 48th IEEE Vehicular Technology Conference (VTC 1998), Ottawa, Canada, May 1998.

J. Blanz, et al., "Performance of a Cellular Hybrid C/TDMA Mobile Radio System Applying Joint Detection and Coherent Receiver Antenna Diversity", IEEE Journal on Selected Areas in Communications, vol. 12, No. 4, May 1994, p. 568.

* cited by examiner

Primary Examiner—Thanh Cong Le
(74) Attorney, Agent, or Firm—Schiff Hardin & Waite

(57) ABSTRACT

A radio communications receiver for detecting first and second contemporaneously transmitted radio signals representative of first and second data. An adaptive antenna detects at least one wave front from the first radio signals, and at least one wave front from the second radio signals. A first radio detector which regenerates first data from the first wave front. An interference canceller subtracts the first radio signals, reconstituted from the first data, from the second wave front, dependent on interference from the first wave front to the second wave front. A second data detector regenerates the second data from the second wave front after the subtraction of the first wave front consequent upon the second radio signals. The first and second data are communicated contemporaneously on at least common parts of the radio frequency spectrum. The present invention finds application with wide band code division multiple access signals (W-CDMA) signals as well as time division-code division multiple access signals (TD-CDMA), and time division multiple access signals (TDMA) such as those generated by the GSM system.

8 Claims, 3 Drawing Sheets

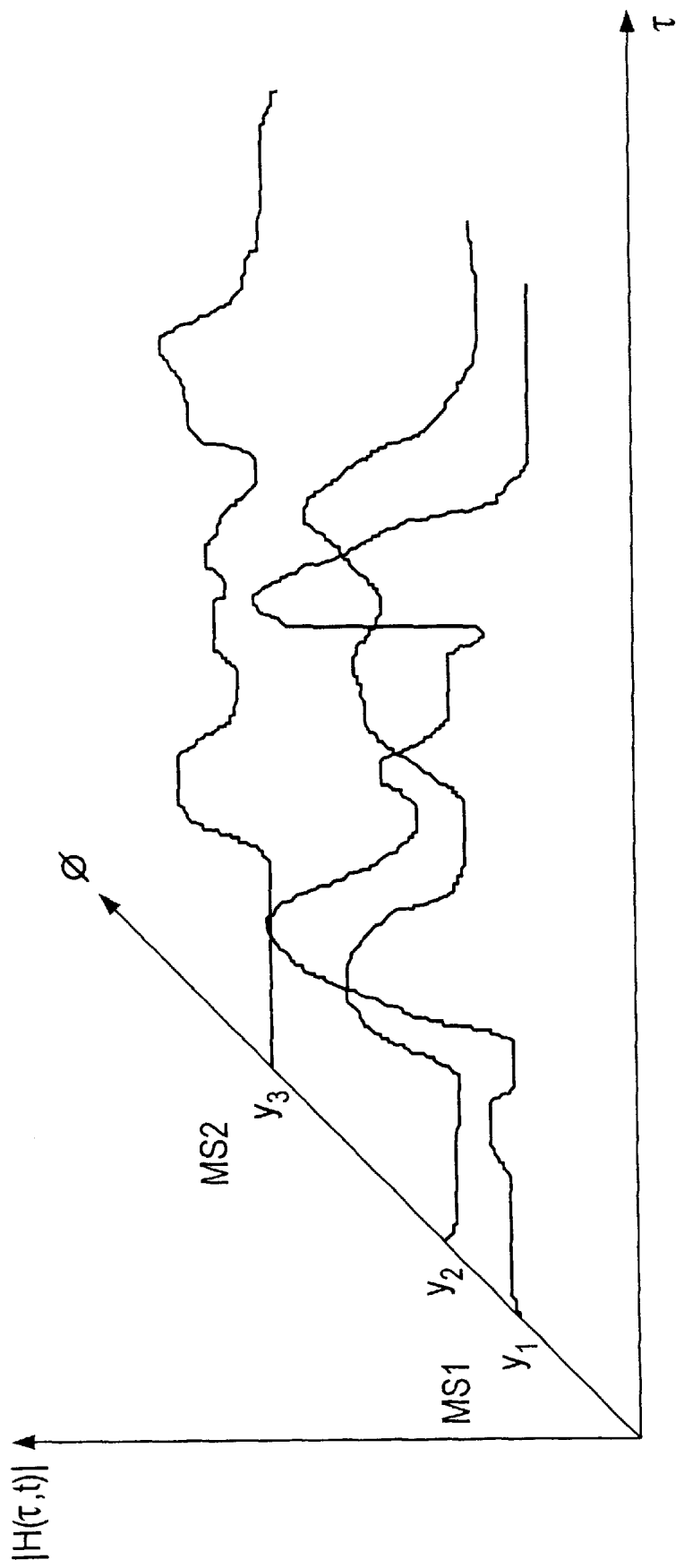

RADIO COMMUNICATIONS RECEIVER AND METHOD OF RECOVERING DATA FROM RADIO SIGNALS

BACKGROUND OF THE INVENTION

1. Field of the Invention

The present invention is directed to radio communications receivers which operate to detect radio signals contemporaneously transmitted by first and second transmitters and to recover first and second data, which the radio signals represent. Furthermore, the present invention is directed to a method of recovering first and second data from contemporaneously transmitted first and second radio signals. Yet more particularly, but not exclusively, the present invention is directed to wireless communications systems which include receivers arranged to recover data contemporaneously transmitted from a number of different transmitters.

2. Description of the Prior Art

Wireless communication systems are arranged to communicate data by transmitting radio signals, which are representative of the data, between transmitters and receivers of a communication system using part of the radio frequency spectrum. As a result of an increasing demand for radio communications, wireless communication systems are arranged to make optimum use of an allocated part of the radio frequency spectrum. To this end, wireless communication systems are arranged to operate in accordance with a multiple access scheme in which a number of data communications channels may be contemporaneously supported in a way which, as far as possible, makes optimum use of the allocated radio frequency spectrum. An example of such a multiple access scheme is time division multiple access in which data from a number of transmitters is communicated in a corresponding number of time slots into which a radio frequency carrier signal is divided. In this way a number of data communications channels are effected, with each time slot representing contemporaneously supported channel.

To further improve a utilization of the radio frequency spectrum allocated to a wireless communication system, receivers, which are arranged to operate within such systems, are known to include adaptive antenna arrays which utilize adaptive beam forming techniques to the effect of exploiting spatial diversity, which is inherent in the communication of radio signals.

An example of a receiver provided with an adaptive antenna array which exploits the spatial diversity is described in an article entitled "A Two Step Spatio-temporal Filtering Scheme for Smart Antennas Compared to a Multiuser Maximum Likelihood Algorithm", by C. Brunner, M. Haardt, C. Farsakh and J. A. Nossek, published in the Proceedings of $48^{th}$ IEEE Vehicular Technology Conference (VTC 1998), Ottawa, Canada, May 1998. This known receiver is provided with an antenna array, which, in combination with a spatio-temporal filter, operates to separate radio signals contemporaneously transmitted from different transmitters to the effect that data represented by each of the radio signals may be recovered by a data detector to which the separated radio signals are fed. As such, a substantial increase in a number of communications channels provided by a wireless communications system may be effected by allowing contemporaneous transmission of radio signals. With this known arrangement, a data detector is assigned to each of the radio signals associated with a particular transmitter, wherein the radio signals have been separated in accordance with an angle of arrival of a wave front of the radio signals at the antenna array by the spatio-temporal filter, such that the data detector recovers the data associated with a particular transmitter.

The term wave front is used herein to refer to a component of a radio signal which arrives at an antenna array at a particular angle having reached the antenna array via one of a number of distinct propagation paths. Thus the use of the term wave front is analogous to its use in connection with the propagation of silent or compression waves, the front or leading part of which are known as "wave fronts".

A disadvantage with this known apparatus is that interfering wave fronts can only be canceled completely by the spatial filter if a relative difference in the angles of arrival of the wave fronts is substantially small. Furthermore, if, for example, a wave front of interest experiences a deep fade as a result of fast fading caused by the radio communications channel, the wave fronts reconstructed by the spatio-temporal filter may be corrupted by a stronger interfering radio signal wave front generated by another transmitter to the effect that a data detector cannot recover the data which the radio signals represent.

SUMMARY OF THE INVENTION

An object of the present invention to provide a radio communications receiver which operates to detect and recover data from a number of contemporaneously transmitted radio signals.

This object is achieved in accordance with the invention by providing an antenna array and a spatio-temporal filter to separate the contemporaneously detected radio signal wave fronts and cancel any interference between the radio signals before detecting the data which the radio signal wave fronts represent.

According to the present invention, there is provided a radio communications receiver for detecting first and second contemporaneously transmitted radio signals representative of the first and second data. The receiver comprises an adaptive antenna which detects at least one wave front from the first radio signals and at least one wave front from the second radio signals; a first radio detector which recovers first data from the at least first wave front; an interference cancellor which subtracts the first radio signals, reconstituted from the first data, from the at least one second wave front, and resulting from interference from the at least one first wave front with the at least one second wave front; and a second data detector which recovers the second data from the at least one second wave front after the subtraction of the first wave front. The first and second data are communicated contemporaneously in at least common parts of the radio frequency spectrum.

The adaptive antenna can further comprise an array of antennas coupled to a spatio-temporal filter having a spatial filter coupled to a wave front detector. Each of the antennas operates to detect a version of the radio signals. The versions of the radio signals are then combined by the spatio-temporal filter. The wave front detector then generates the first and second radio signal wave fronts from the combined radio signal versions.

By providing an adaptive antenna system which detects and separates radio signal wave fronts formed by different radio signals transmitted from different transmitters, and by subsequently affecting an interference cancellation of one wave front from one radio signal from a wave front of another radio signal, data from a relatively weak wave front or one which is corrupted by a stronger interfering wave front may be detected by the receiver.

The interference cancellor may comprise a signal re-constitutor coupled to the first data detector, which re-constitutes the first radio signals in accordance with the detected first data and in a form in which the first radio signals were transmitted, and a signal cancellor which substantially subtracts the re-constituted first radio signals from the at least one second wave front thus forming a substantially interference free version of the second radio signals.

The interference cancellor may further include a cross-correlation estimator, coupled to the adaptive antenna, which determines a cross-correlation factor representative of an amount by which the at least one second wave front is interfered with by the at least one first radio signal wave front, and a multiplier coupled between the signal re-constitutor and the signal cancellor and arranged to scale the re-constituted signals with the cross-correlation factor.

The receiver according to the present invention provides an advantage in allowing data from different contemporaneously transmitted radio signals to be detected without the complexity of performing a full joint detection process or a full interference cancellation process. A joint detection process is used, for example, in detecting and recovering data represented as time division-code division multiple access radio signals. An explanation of a joint detection process is provided in an article entitled "Performance of a Cellular Hybrid C-TDMA Mobile Radio System Applying Joint Detection and Coherent Receiver Antenna Diversity", by G. Blanz, A. Klein, M. Nallhan and A. Steil, published in the IEEE Journal on Selected Areas in Communications, Volume 12, No. 4, May 1994 at page 568, the content of which is incorporated herein by reference. Furthermore, by combining an adaptive antenna system having a spatio-temporal filter with interference cancellation, a flexible trade off between computational complexity and performance is achieved.

A receiver in accordance with the present invention provides a further advantage when used with a wireless mobile radio communications system in that requirements for fast power saving control and soft hand over are substantially alleviated.

Interference cancellation may be effected by regenerating the interfering signal from previously detected data from a stronger of the radio signal wave fronts, and substantially canceling this regenerated signal from the weaker of the signals before data detection. A receiver in accordance with the present invention may be used in either a mobile station or a base station of a wireless communication system.

Further, interference cancellation may be effected to reconstitute a stronger of the interfering signals by modulating and re-coding the detected data. The interference cancellation means may be a joint detection processor where the first and second radio signals have been generated in accordance with a time division-code division multiple access scheme.

In an embodiment of the present invention, there is a provided a method of recovering first and second data from contemporaneously transmitted first and second radio signals. First and second radio signals are detected and separated into a number of radio signal wave fronts. At least one of the wave fronts is associated with the first radio signals, and at least one other of the wave fronts is associated with the second radio signals. A relative strength of the separated radio signal wave fronts is determined dependent on an amount of mutual interference between the first and second wave fronts. The first or second data is detected where the strength of the wave fronts associated with the first or second radio signals is sufficient to recover the first or second data in the presence of the interference between the first and the second radio signals. The first or the second radio signals are substantially canceled from the other of the first or the second wave fronts dependent on whether the first or second data is detected. The other of the first and second data is then detected from the subtracted radio signals.

When the first or second radio signals are canceled from the other of the first or the second wave fronts, the first or second radio signals can be re-constituted dependent on which of the first and second data is recovered and in accordance with the detected data and in a form in which the radio signals were transmitted. The re-constituted radio signals are then subtracted from the other of the first or the second radio signals.

A cross-correlation factor between the first and the second radio signals can also be estimated. The re-constituted signals can then be scaled with the cross-correlation factor before subtracting the signals from the other of the first and second radio signals.

DESCRIPTION OF THE DRAWINGS

FIG. 3 shows channel impulse response estimates determined by a wave front detector which appears in the schematic block diagram of the receiver in FIG. 2.

DESCRIPTION OF THE PRESENTLY PREFERRED EMBODIMENTS

Figure 1:
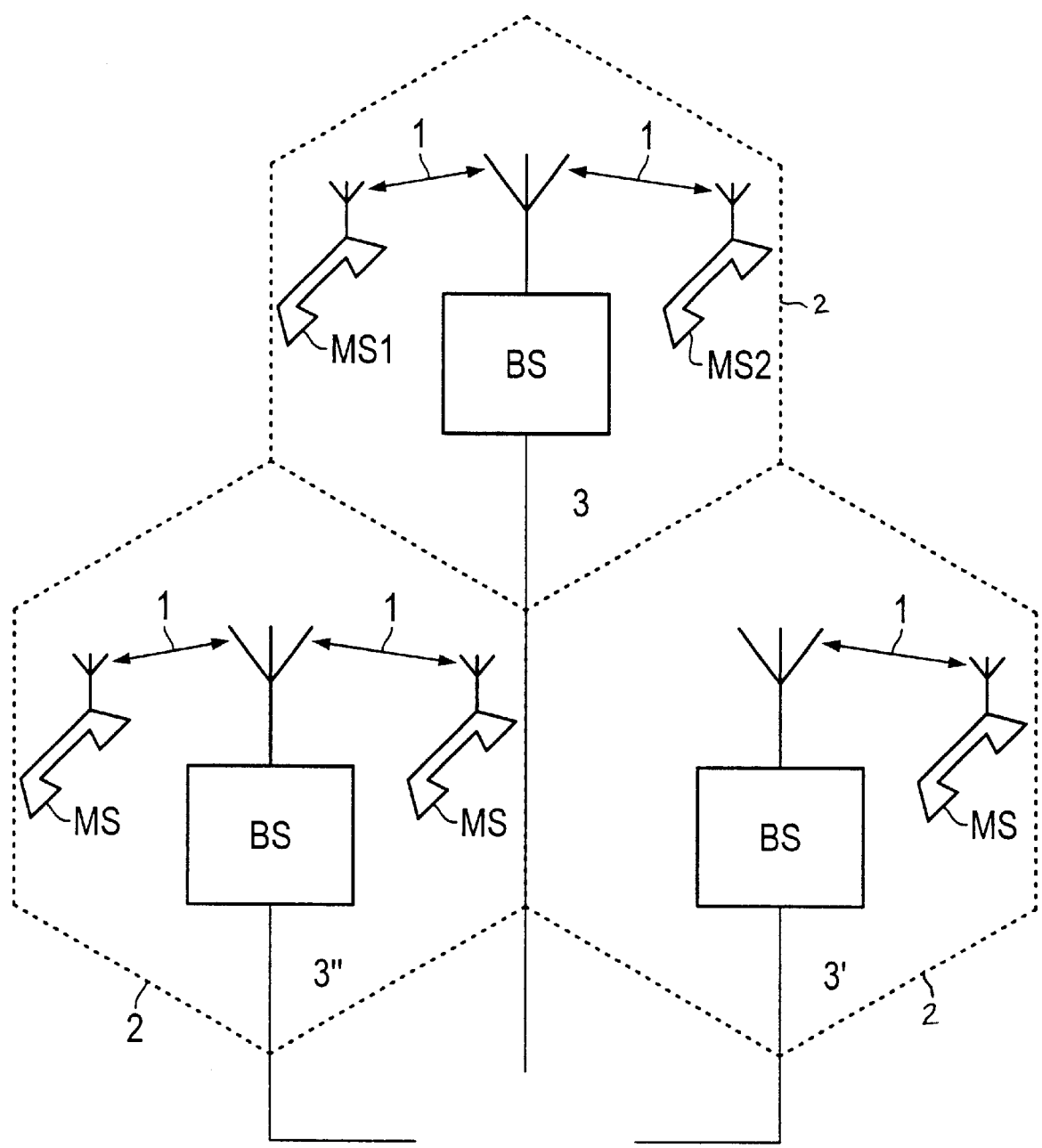
FIG. 1 is a schematic block diagram of part of a mobile radio communication system constructed and operated in accordance with the invention.

An example embodiment of the present invention will be described with reference to a wireless communications system, and in particular to a mobile radio telephone communications system. FIG. 1 shows a block diagram of a mobile radio communication system. In FIG. 1, three base stations BS form part of a mobile radio network, interconnected via an infra-structure (not shown). Data is communicated between mobile stations MS and the base stations BS by transmitting and receiving radio signals 1 between the base stations BS and the mobile stations MS, which operate within a radio coverage area affected by each of the base stations, which form covered cells 3, 3', and 3". Each radio coverage area is shown illustrated as a broken line 2, and serves to indicate a boundary within which radio communications can be effected with the respective mobile stations MS. In the present illustrative embodiment the mobile stations MS communicate with the base stations BS via radio signals 1 generated in accordance with the Global System for Mobiles (GSM) standard.

As illustrated in FIG. 1, two mobile stations MS1 and MS2 in cell 3 are arranged to communicate bursts of radio signals 1 contemporaneously in the same time and on the same frequency. In order to separate the data communicated by the first and second mobile stations MS1 and MS2, a receiver 30 (FIG. 2) embodied within the base station BS detects and separates the first and second radio signals 1 transmitted by the first and the second mobile stations MS1 and MS2, in accordance with an inherent spatial diversity of these radio signals 1. An example embodiment of this receiver 30 is shown in FIG. 2, where parts also appearing in FIG. 1 bear identical designations.

Figure 2:
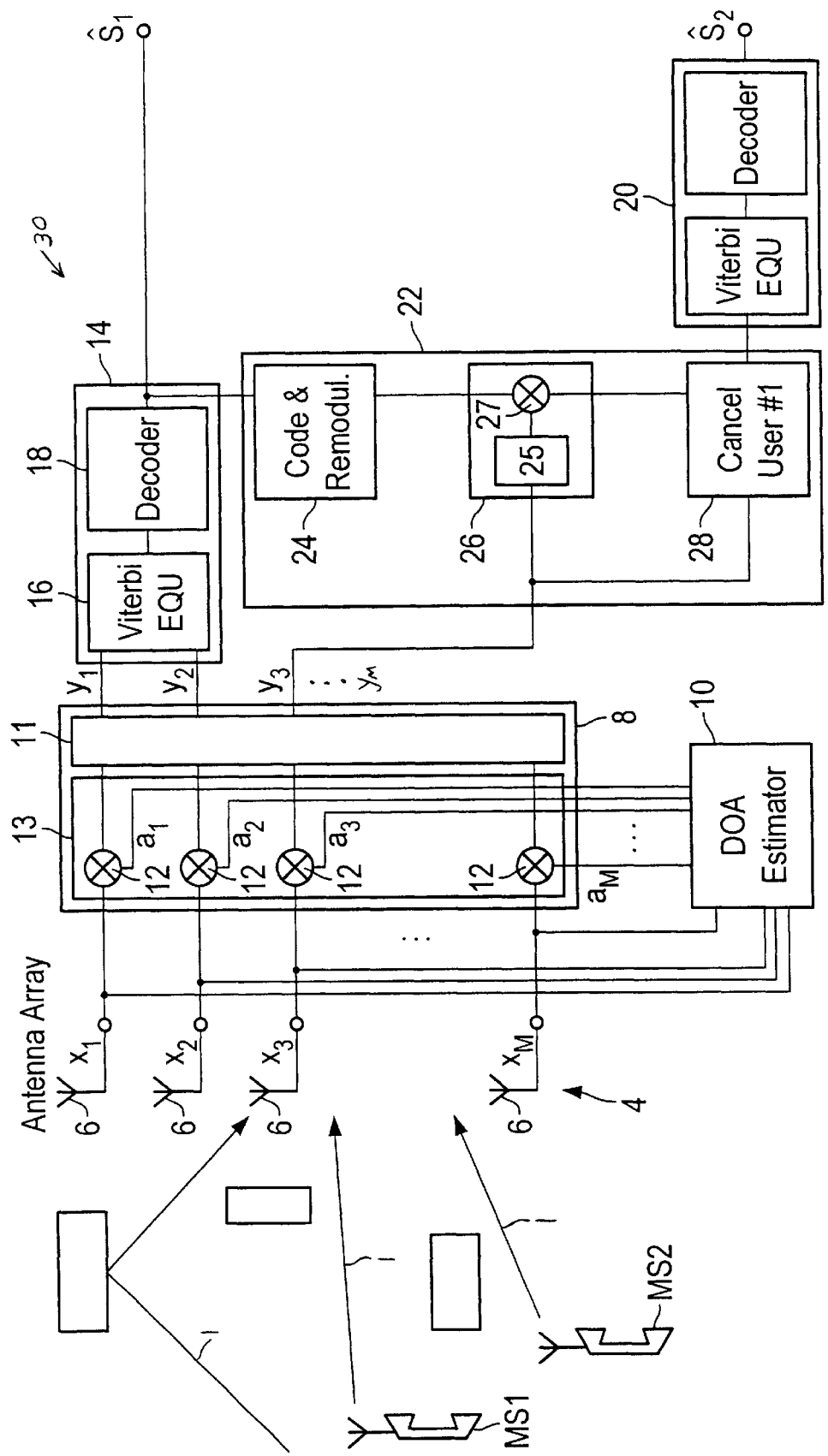
FIG. 2 is a schematic block diagram of a receiver for radio signals constructed and operated in accordance with the invention.

In FIG. 2, an array of antennas 4 is provided with each antenna 6 of the array 4 coupled to a corresponding input of a spatio-temporal filter 8. A direction of arrival estimator 10 is coupled to further inputs of a spatio-temporal filter 8. The direction of arrival estimator 10 generates a number of scaling coefficients $a_M$ which are fed to first inputs of a number of multipliers 12. The multipliers 12 form a spatial filter 13. Thus, each version of the radio signals 1 detected by each of the antennas 6 are scaled with a corresponding coefficient $a_M$ generated by the directional arrival estimator 10. The scale versions of the radio signal are then fed into a wave front detector 11, which combines the received scaled radio signals to form a number of radio signal wave fronts $y_M$ at the outputs of the wave front detector 11. Each of the radio signal wave fronts $y_M$ is associated with radio signals 1 transmitted by one of the mobile stations MS1 and MS2 and arriving at the antenna array 4 at a particular angle of arrival. Thus in effect the spatial-temporal filter 8 separates, as far as possible, radio signals 1 contemporaneously transmitted by each of the mobile stations MS1 and MS2 in accordance with the angle of arrival of these radio signals 1 at the antenna array 4.

As will be appreciated by those skilled in the art, as a result of multi-path propagation, which is a characteristic of radio communications, a number of wave fronts which have been generated by the same transmitter may arrive at the antenna array 4. Therefore, as illustrated by the present example embodiment, the wave fronts $y_1$ and $y_2$ are associated with the radio signals 1 transmitted by the first mobile station MS1, and are therefore fed to the same data detector 14. The wave front detector 11 estimates the channel input response associated with each of the wave fronts $Y_1$ and $y_2$ and determines a relative strength of each of the wave fronts $y_1$ and $y_2$. The channel impulse responses are estimated by correlating the radio signals 1 corresponding to each wave front $y_1$ and $y_2$ with a training sequence embodied within the radio signals 1 and which is known at the receiver 30. In accordance with the determined strength of the wave fronts $y_1$ and $y_2$, the spatio-temporal filter 8, is able to determine whether data may be recovered from a particular set of wave fronts associated with the same transmitted radio signals.

In an example embodiment, the wave fronts $y_1$ and $y_2$ associated with MS1 are fed to a data detector 14, which detects and recovers the data $\hat{S}_1$ represented by these wave fronts $y_1$ and $y_2$. In the present example embodiment the data is modulated into radio frequency signals in accordance with the radio communications transmission process determined in accordance with the GSM system. As such, the data detector 14 embodies viterbi equalizer 16 and a data decoder 18. A more detailed explanation of the operation of the spatio-temporal filtering is provided in the above referenced article "A Two Step Spatio-temporal Filtering Scheme for Smart Antennas Compared to a Multi-user Maximum Likelihood Algorithm", by C. Brunner, M. Haardt, C. Farsakh and J. A. Nossek.

FIG. 3 illustrates an example of channel impulse response estimates determined by the wave front detector 11. As will be appreciated from FIG. 3, the signal strength of the radio signals 1 generating the wave fronts $y_1$ and $y_2$ is considerably greater than the signal strength of the radio signals 1 generating the wave front $y_3$ transmitted by the second mobile station MS2. Therefore, in order to detect and recover the data $\hat{S}_2$ communicated by the wave front $y_3$, the stronger interfering radio signal wave fronts $y_1$ and $y_2$ generated by MS1, must be canceled from the radio signal wave front $y_3$ before data $\hat{S}_2$ is detected by the data detector 20. In this way, the data $\hat{S}_2$ represented by the radio signals 1 transmitted by mobile station MS2 may be recovered from the contemporaneously transmitted and thereby mutually interfering radio signals 1 detected by the antenna array 4. Thus, in a presence of the stronger interfering signals represented by the radio signal wave fronts $y_1$ and $y_2$ the receiver 30 is able to recover the data $\hat{S}_2$ transmitted by the second mobile station MS2 from the radio signal wave front $y_3$ in spite of the presence of the stronger interfering signals from the first mobile station MS1. To this end, an interference canceller 22 is provided which comprises a signal re-constitutor 24, a cross correlation estimator 26, and a signal canceller 28.

The spatio-temporal filter 8 generates a channel impulse response corresponding to each of the mutually interfering radio signals 1 from the mobile stations MS1 and MS2 by comparing the detected combined radio signal wave fronts with a training sequence embodied in the transmitted radio signals 1 and which is known to the spatio-temporal filter 8. Furthermore, by comparing the detected training sequences from each of the radio signals 1 transmitted by the mobile stations MS1 and MS2, an estimate of a cross correlation factor x, between the radio signal wave fronts may be determined. This is estimated by the cross-correlation detector 26 and provides a scaling factor to scale the reconstituted interfering signal from MS1. Thus in order to cancel the interfering signals $y_1$ and $y_2$ from the radio signal detected from MS2, the signal re-constitutor 24 remodulates and recodes the data $\hat{S}_1$ which is detected at the output of the data detector 14. Thus at the output of the signal re-constitutor 24 there is a representation of the radio signals as transmitted by the mobile station MS1. By scaling these re-constituted signals by the correlation factor x generated by the cross correlation detector 26, a representation of the interfering signals $y_1$ and $y_2$ as detected at the antenna array 4, is generated at the output of the cross correlation detector 26. This is effected by the cross correlation factor x, which is fed to the multiplier 27, which operates to scale the re-constituted signals with the cross correlation factor x.

The radio signals corresponding to the detected wave front $y_3$ are fed to a first input of the signal cancellor 28. To a second input of a signal cancellor 28, are fed the scaled versions of the re-constituted interfering signals from the first mobile station MS1. The signal cancellor 28 subtracts the interfering signals from mobile station MS1 from those signals from mobile station MS2 represented by the detected wave front $y_3$. At the output of the signal cancellor 28 radio signals substantially corresponding to those received only from mobile station MS2 are provided and fed to data detector 20, which operates to recover data $\hat{S}_2$ transmitted by the second mobile station MS2.

Although modifications and changes may be suggested by those of ordinary skill in the art, it is the intention of the inventor to embody within the patent warranted hereon all changes and modifications as reasonably and properly come within the scope of his contribution to the art. In particular other modulating encoding schemes may be used to communicate data. However, the present invention provides a particular example in that data from the interfering signal is canceled after decoding and therefore is provided with a substantial coding gain to the effect that the reconstituted interfering radio signal may be more effectively canceled from the desired signal. The present invention finds application with wide band code division multiple access (W-CDMA) signals as well as time division-code division multiple access signals (TD-CDMA), and time division multiple access (TDMA) signals such as those generated by the GSM system.

What is claimed is:

1. A radio communications receiver for detecting first and second contemporaneously transmitted radio signals representative of first and second data, said receiver comprising:

an adaptive antenna that receives said first and second radio signals and detects at least one first wave front from said first radio signals and at least one second wave front from said second radio signals, said adaptive antenna including:
an antenna array having a number of adaptive antennas that detect versions of said first and second radio signals; and
a spatio-temporal filter coupled to said antenna array, said spatio-temporal filter comprising:
a spatial filter having a number of inputs coupled to said number of adaptive antennas outputs, and a number of outputs; and
a wave front detector having a number of inputs coupled to said spatial filter number of outputs, and at least a first, a second and a third output, wherein said wave front detector generates said first and second radio signal wave fronts from said combined radio signal version, and wherein one of said at least one first wave fronts is output on said first wave front detector output, another of said at least one first wave fronts is output on said second wave front detector output, and at least one of said second wave fronts is output on said third wave front detector output;
wherein said spatio-temporal filter combines said radio signal versions;
a first data detector having a first input coupled to said first wave front detector output and a second input coupled to said first wave front detector output, wherein said first data detector recovers first data from said first wave front and outputs said first data;
an interference canceller having a first input coupled to said first data detector output and a second input coupled to said third wave front detector output, and an output, wherein said interference cancellor re-constitutes said first radio signals from said first data and subtracts said re-constituted first radio signals from said at least one second wave front dependent on interference from said at least one first wave front to said at least one second wave front; and
a second data detector having an input coupled to said interference cancellor output, wherein said second data detector recovers said second data from said at least one second wave front after said subtraction of said first wave front and outputs said second data, and wherein said first and second data are transmitted contemporaneously on at least common parts of the radio frequency spectrum.

2. A radio communications receiver as claimed in claim 1, wherein said interference cancellor comprises:
a signal re-constitutor having an input coupled to said first data detector output, and an output, wherein said signal re-constitutor receives said first data from said first data detector and re-constitutes said first radio signals in accordance with said detected first data in a form in which said first radio signals were transmitted; and
a signal cancellor having an input coupled to said signal re-constitutor output, wherein said signal cancellor substantially subtracts said re-constituted first radio signals from said at least one second wave front, and wherein an output of said signal cancellor is a substantially interference free version of said second radio signals.

3. A radio communications receiver as claimed in claim 2, wherein said interference cancellor further comprises:
a cross-correlation estimator having an input coupled to one of said third spatio-temporal filter output, and an output, wherein said cross-correlation estimator determines a cross-correlation factor representative of an amount by which said at least one second wave front is interfered by said first radio signal wave front; and
a multiplier operably coupled between said signal re-constitutor and said signal cancellor, wherein said multiplier scales said re-constituted signals with said cross-correlation factor.

4. The radio communications receiver according to claim 2, wherein said signal reconstitutor further comprises a modulator and a channel coder.

5. The radio communications receiver according to claim 4, wherein said signal re-constitutor further comprises a combiner that combines said first data with a spreading code, wherein said first radio signals are generated in accordance with code division multiple access.

6. A method of recovering first and second data from contemporaneously transmitted first and second radio signals, said method comprising the steps of:
detecting and separating said first and second radio signals into a number of wave fronts, wherein a first wave front comprises at least one of said wave fronts associated with said first radio signals, and a second wave front comprises at least one other of said wave fronts associated with said second radio signals;
determining a relative strength of said separated wave fronts dependent on an amount of mutual interference between said first and second wave fronts;
detecting said first data where the strength of said separated wave fronts associated with said first radio signals is sufficient to recover said first data in a presence of interference between said first and second radio signals;
substantially canceling said first radio signals from said second wave front dependent on said first data detected;
detecting said second data from said second wave front after cancellation of said first radio signals from said second wave front.

7. The method according to claim 6, wherein the step of canceling said first radio signals from said second radio wave front further comprises the steps of:
re-constituting said first radio signals in accordance with said detected first data and in a form in which said first radio signals were transmitted; and
subtracting said re-constituted first radio signals from said second radio signals.

8. The method according to claim 7, further comprising the steps of:
estimating a cross correlation factor between said first and second radio signals; and
scaling said re-constituted signals with said cross-correlation factor before subtracting said re-constituted first radio signals from said second radio signals.

* * * * *